INVENTOR.
Lawrence M. Halls
BY
George C. Bower
Attorney

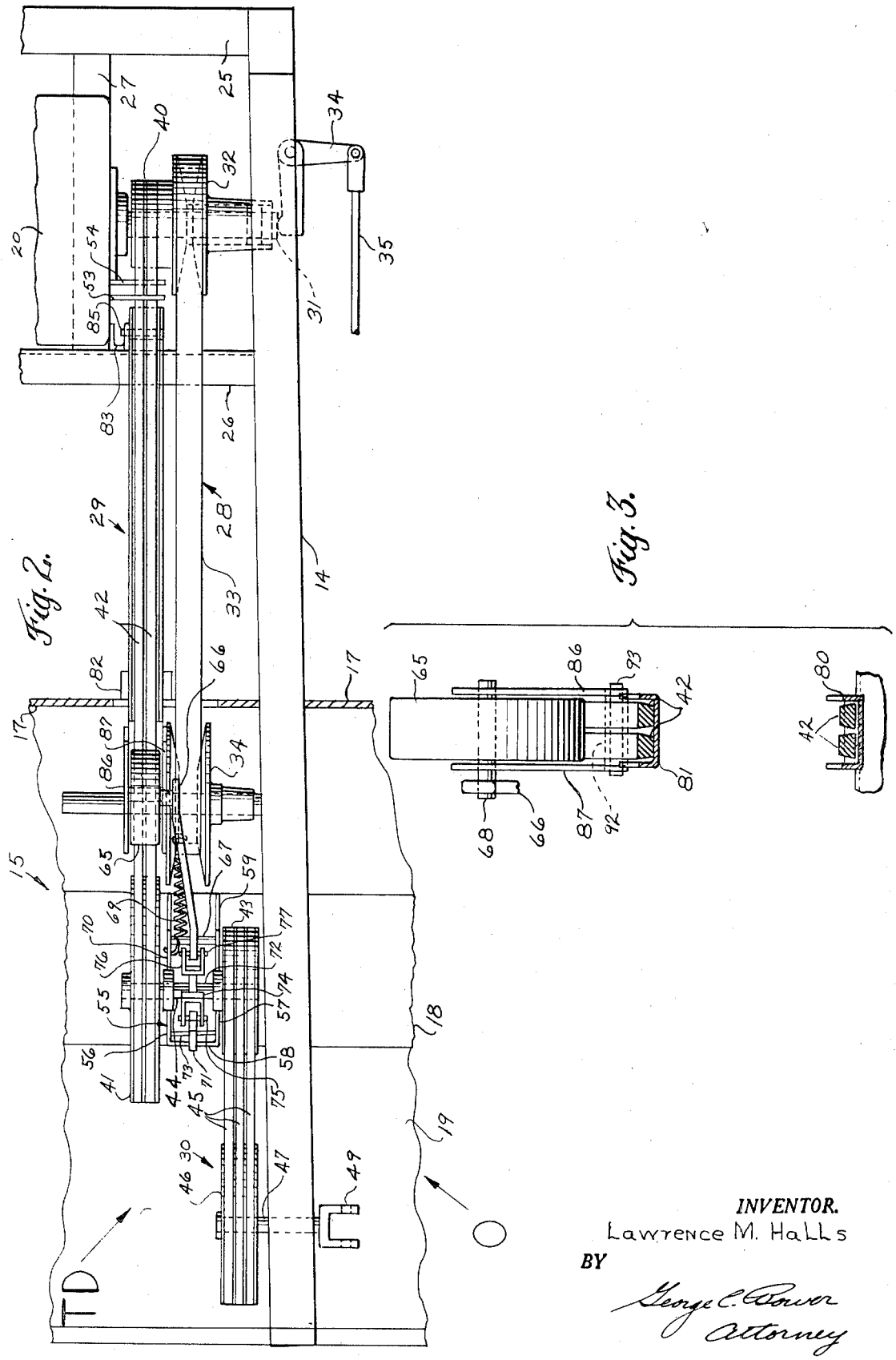

United States Patent Office 3,550,463
Patented Dec. 29, 1970

3,550,463
DISENGAGEABLE BELT AND SHEAVE DRIVE WITH BELT SUPPORTS
Lawrence M. Halls, New Holland, Pa., assignor to Sperry Rand Corporation, New Holland, Pa., a corporation of Delaware
Filed Feb. 26, 1969, Ser. No. 802,513
Int. Cl. F16h 7/12
U.S. Cl. 74—226    3 Claims

ABSTRACT OF THE DISCLOSURE

A disengageable belt and sheave drive has a roller movable between drive and non-drive conditions to tension the belts for driving and release the belts for non-driving. A power run support member and a pivotally mounted return run support member hold the belts in slack condition out of contact with the drive sheave.

BACKGROUND OF THE INVENTION

This invention relates to belt drives for supplying power to a header on a self-propelled harvesting machine and is directed particularly to support means holding the belts out of driving relation when in slack condition.

In self-propelled harvesting equipment the engine driving the tractor also drives the harvesting header mounted on the front of the tractor. The power requirements of the header and tractor are distinct and, therefore, are separately taken from the engine and separately controlled. When the tractor is driven with the header in the non-operating position there is no need for power to the header. On the other hand the header may be operated with the tractor stopped and in other instances it is desirable to run the engine with both the tractor and header stopped. Further the tractor speed is variable depending on crop and surface conditions while the header is operated at a constant speed.

Since the header is either driven at a constant speed or stopped an inexpensive drive may be used. A drive with a belt having substantial slack and a tension roller is an acceptable type. However, there is the disadvantage that a slack belt in a non-operative condition may be caught or jammed against the driven sheave and the header will be operated. This may be dangerous if the harvester is temporarily stopped to clear or repair the header with the engine running.

It is, therefore, desirable to provide belt drive in which a slack belt will not under any circumstances be gripped by the driven sheave causing the header to operate.

OBJECTS AND SUMMARY OF THE INVENTION

An object of this invention is to provide an inexpensive drive for a header that is distinctly either in an operative drive condition or in an inoperative non-driving condition.

Another object of this invention is to provide a belt drive supplying power to a header from an engine on a self-propelled harvesting machine that only has an operative drive condition and an inoperative non-driving condition.

In summary this invention comprises an endless belt drive having a drive sheave and driven sheave coupled by endless belt means engaged by a roller to force said belt means into an operative drive condition and held by support means extending between the sheaves in a non-driving inoperative condition.

These and other objects and advantages of this invention will be apparent from the following description and claims taken in connection with the accompanying drawings which illustrate the various features of this invention.

BRIEF DESCRIPTION OF THE DRAWINGS

FIG. 2 is a top view of the belt drive.
FIG. 3 is a fragmentarily sectional view of the belt and belt guides and supports in relation to the roller taken along lines 3—3 of FIG. 1.

DETAILED DESCRIPTION OF PREFERRED EMBODIMENT

General description

Figure 1:
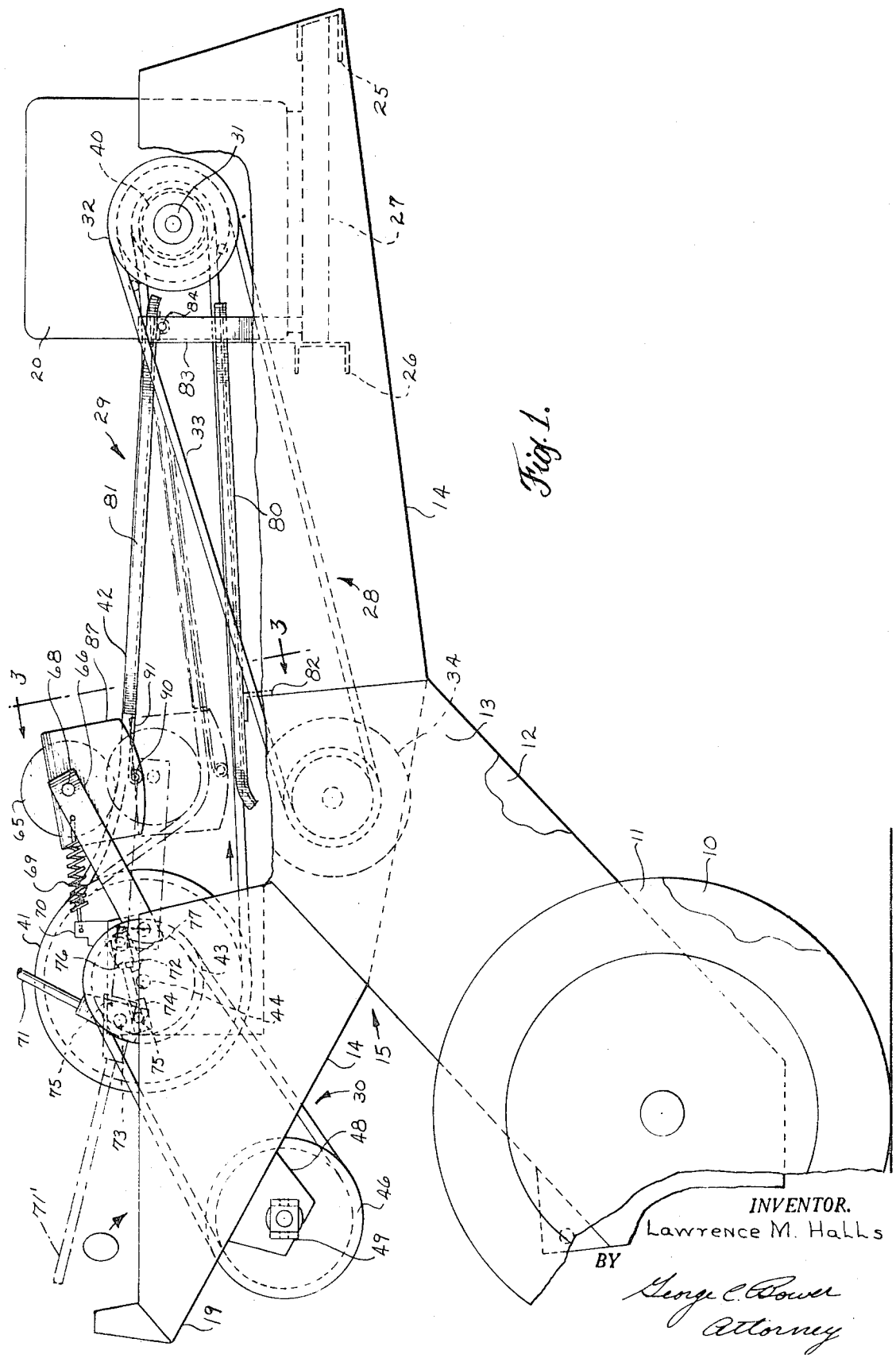
FIG. 1 is a side view of the belt drive with the tractor fragmentarily shown.

The tractor of a self-propelled harvesting machine with a header (not shown) is partially illustrated in FIG. 1 of the drawings. The tractor is supported on two spaced driving wheels 10, 11 through side members or casings 12, 13 and has a center beam 14 extending the length of the tractor through the center. The tractor has a forward frame 15 forming the operator's section O on the left side of the center beam and the transmission and drive section TD on the right side of the center beam. The side members or casings 12, 13 are on opposite sides of the forward frame to provide a wide span between the drive wheels 10, 11. The forward frame 15 has a cross beam 17 and a torsion beam 18 extending transversely across the entire width of the tractor.

At the front of the tractor is a forward panel or member 19 forming the front of the operator's section O and the transmission and drive section TD. The header (not shown) is pivotally mounted on the spaced side members or casings 12, 13. The center beam 14 extends rearwardly of the forward frame in cooperation with a rearwardly extending side beam (not shown) on the right side, to support an engine 20 by means of the rear beam 25, mid beam 26, and the longitudinal supports 27 (FIG. 2).

The engine has an output shaft 31 to supply power to the drive wheels through the belt and sheave drive 28 and the header through the belt and sheave drive 29. The drive 28 is connected to the wheels 10, 11 through transmissions, gears and shafts in the forward frame 15 and the side casings 12, 13. The belt and sheave drive 29 drive the header through the forward belt and sheave drive 30 connected to a power take-off (not shown).

Tractor drive

The tractor belt and pulley drive 28 has a variable drive sheave 32 mounted on the engine output shaft 31, a single flexible rubber belt 33 and a variable driven sheave 34 mounted on the shaft connected to transmissions (not shown) in the transmission and drive section of the forward frame of the tractor. The speed of the tractor is controlled by varying the pitch diameter of the variable sheave 32 on the engine output shaft. The pitch diameter is varied by the bell crank 34 and control rod 35 extending to the operator's section for manipulation by the tractor operator.

Header drive

The belt and pulley drive 29 has a fixed drive sheave or pulley 40 mounted on the output shaft 31 of the engine 20 and a larger fixed sheave or pulley 41 mounted on the intermediate output shaft 44. Both sheaves have two grooves. Two continuous belts 42 are mounted on the two pulleys. The power take-off belt and pulley drive 30 connecting the variable speed header belt and sheave drive 29 to the power take-off has a three groove sheave 43 mounted on the shaft 44 with three belts 45 connected to the three groove driven sheave 46 mounted on the shaft 47 rotatably supported in the mounting 48 on the front of the center beam 14. The shaft has a yoke 49 on the opposite side of the center beam from the driven sheave 46 for connection to a power takeoff mechanism driving the header. The intermediate shaft 44 is rotatably mounted in a fixed pedestal 55 on the top side of the triangular shaped torsion beam 18. The pedestal 55 is of a tubular rectangular shape having two side walls 56, 57 extending longitudinally to the tractor and cross wise to the torsion beam 18 and two shorter end walls 58, 59 to form a chamber.

The two belts 42 have a length to normally assume a slacked position for non-transmission of power from the drive pulley 40 to the driven pulley 41. The belts may be placed under tension by the roller 65 which is rotatably mounted on the arm 66. The arm 66 is pivotally mounted on the pedestal 55. The roller in the drive or tension position is shown in dot-dash lines. The belts are placed under tension so that the driven sheave 41 is rotated by the drive sheave 40. Upper and lower guide posts 53, 54 are mounted on the engine frame to hold the belts 42 around the sheave 40.

Roller 65 is approximately the same size as the drive sheave 40 and has a smooth cylindrical outer surface engaging the outsides of the belts. The arm 66 is pivotally mounted on a pin 67 extending through the side walls 56, 57 of the pedestal. The rear edge wall 59 of the pedestal is sloped and has an opening for passing the arm. A shaft 68 is mounted on the roller end of the arm 66 for rotatably supporting the roller 65 thereon. A helical spring 69 is connected to the arm 66 adjacent the shaft 68 and, at the other end, to the projection 70 rigidly attached to the side wall 56 of the pedestal 55. The helical spring 69 normally holds the arm 65 and the roller 66 in the raised position as shown in FIG. 1 with the belt 42 in the slack condition.

The arm 65 is actuated by a control lever 71 pivotally mounted on the pedestal 55 and by the adjustable lever connector 72 between the control lever and the arm. A pin 73 is mounted in the side walls 56, 57 for pivotally supporting the control lever 71 therebetween. The lever connector 72 comprises a yoke 74 pivotally connected to the control lever by a pin 75. The yoke is connected to a clevis 76 pivotally connected to the arm 66 by the pin 77.

As previously mentioned the control lever 71 and arm 66 are shown in full lines with the belt in the slack position. In the dot-dash position the control lever 71' is in drive. In this position the pin 75 moves to the position 75' and the lever connector to position 72' illustrated in FIG. 1. In this position the linkages have passed through dead center and cannot return to the slack position except by the clockwise movement of the control lever.

Thus the belt and pulley drive 29 is held in a tension transmission condition by the control linkage being passed dead center and the roller 66 depressed, or in a non-transmission condition with the roller held in a raised position by the helical spring. The lever connector 72 may be varied to set the arc of travel of the control lever.

Support means

The return and power runs of the belts have upper and lower support members 80, 81 respectively, for holding the belts when slack. The support member 80 has a U-shape and extends from adjacent to the drive sheave 40 forwardly below the roller 65. The support member 80 is fixedly mounted. At the front end it is fixedly mounted on the L-shape bracket 82 attached to the cross beam 17 and, at the rear end, it is fixedly attached to the U-shape vertically extending post 83 bolted to the motor frame. The lower run is the power transmitting run of the belts and the forward edge of the guide support is curved downwardly to avoid rubbing or catching of the belts.

The upper or return run of the belts rests on the upper, U-shaped member 81 for holding the belts in the slack condition. At the drive sheave end bracket 84 is mounted on the bottom for rotatably receiving the pin 85 extending through the post. The pin 85 is axially secured to the post and permits the support member 81 to pivot thereabout.

At the other end, plates or links 86, 87 are pivotally mounted on the shaft 68 of the roller 65 and attached to the arm 66. The plates are of a generally rectangular configuration and are planar with the forward and rear edges curved slightly outward to gradually narrow the opening between the plates. The plates extend longitudinally to the belt and have a length greater than the diameter of the pulley. On running of the belt the plates prevent the belts from going off of the pulley. The plates extend below the roller 65 and have a pin 90 extending perpendicular to the plates and parallel to the shaft 68 and spaced from the periphery of the roller to permit the passage of the belts 42 therebetween. This spacing is maintained in all positions of the roller. The support member 81 extends to the guide plates and has a bracket 91 with a tubular cylindrical end 92. The bracket 91 is secured to the roller end of the support member 81 and the tubular cylindrical portion 92 has the pin 93 (FIG. 3) extending therethrough to pivotally mount the roller end of the support member.

Thus the guide member 81 is pivotally mounted in the guide plates 86, 87 which are in turn pivotally mounted on the roller shaft 68. As the roller 65 is raised and lowered the plates 86, 87 raise and lower the support member 81. In the slack or non-driving position the upper runs are picked up by guide member 81. This action in cooperation with the lower support member 80 lifts the belts clear of the drive sheave. The belt remains stationary while the drive sheave rotates. Although the belts are flexible there is a sufficient degree of stiffness to the belt to hold the shape of loop separate from the drive sheave. The posts 53, 54 do not prevent the spacing of the loop from the sheave 41. In the power transmitting state the belts do not engage the supports. The supports function only in the slack condition.

Features of the invention

It is thus seen from the foregoing description that a belt and sheave drive has been provided that definitely has only two conditions, an operative drive condition and an inoperative non-driving condition. These two distinct conditions are attained without the use of clutch but with an inexpensive belt and sheave drive in which the driving and driven sheaves are spaced apart. In the drive condition the roller 65 holds the belt under tension and gripping relation with the drive and driven pulley. The lower and upper support members 80, 81 preferably should not be and are not engaged by the moving belts. The belts lift clear of the lower support member and the upper support member.

The control lever has only two positions. The generally horizontal position, shown in dot-dash in FIG. 1, to hold the belts in drive relation and in the generally vertical position, shown in full lines in FIG. 1. The spring 69 holds the roller 65 and lever 71 in the slack non-driving position and the movement of the pin 75' past dead center holds the lever 71' in the driving position. Physical act by an operator is required to move the lever into either position. This in cooperation with the support members 80, 81 holding the belts free of the drive sheave insure that the belts will not shift into a transmitting condition either by slack belts casually falling into gripping relation with the pulleys when in the non-driving condition or the lever 71 dropping into the drive position. Thus the header drive is either in a drive or a non-driving condition.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. In a belt drive comprising a drive sheave, a driven sheave, a continuous belt means runs around said sheaves with a power run and a return run and having a length providing non-transmission of power under slack conditions and transmission of power under tension conditions and a roller engaging said belt means on the return run and an arm rotatably supporting said roller and having a first pivotal mounting for movement of said roller to shift said belt means between slack and tension conditions, a first support means extending between said drive sheave and said driven sheave along said power run to support said power run under slack conditions; a second support means extending between said drive sheave and said roller along said return run for supporting said return run under slack conditions and said second support means having a second pivotal mounting adjacent said drive sheave, said first pivotal mounting being on the opposite side of said roller from said second pivotal mounting, link means pivotally connected to the roller end of said arm and pivotally connected to said second support means at the opposite end from said second pivotal mounting to shift said second support means with said roller for supporting said return run in slack condition whereby said first and second support means hold said belt clear of said drive sheave and stationary under slack conditions.

2. In a belt drive as set forth in claim 1 wherein said link means are plates on each side of said roller extending longitudinal to said belt means for retention on said roller.

3. In a belt drive as set forth in claim 1 wherein a control rod, over-center connecting lever means and a roller arm with a rotatable supporting shaft affixed thereto are provided and said roller arm rotatably supporting said roller, and said over-center connecting lever means pivotally connected to said shaft and to said control rod for shifting said belt between slack and tension conditions and for passing through dead center to hold said belt under tension.

References Cited

UNITED STATES PATENTS

| 151,256 | 2/1874 | Walker | 74—242.1 |
| 2,888,829 | 6/1959 | Roehm | 74—242.1 |

FOREIGN PATENTS

| 381,367 | 11/1907 | France | 74—226 |
| 981,086 | 1/1965 | Great Britain | 74—242.1 |

JAMES A. WONG, Primary Examiner

U.S. Cl. X.R.

74—240, 242.1